United States Patent [19]

Abels et al.

[11] 4,161,992

[45] Jul. 24, 1979

[54] VEHICLE WITH INTERNAL-COMBUSTION ENGINE

[75] Inventors: Theodor Abels; Bernhard Götz, both of Aschaffenburg, Fed. Rep. of Germany

[73] Assignee: Linde Aktiengesellschaft, Wiesbaden, Fed. Rep. of Germany

[21] Appl. No.: 865,299

[22] Filed: Dec. 28, 1977

[30] Foreign Application Priority Data

Dec. 29, 1976 [DE] Fed. Rep. of Germany ....... 2659282

[51] Int. Cl.² .............................................. B60K 17/10
[52] U.S. Cl. ................................................... 180/306
[58] Field of Search ................. 180/66 R, 44 R, 44 P, 180/82; 60/465; 214/1 D, 130 R

[56] References Cited

U.S. PATENT DOCUMENTS

| 3,727,774 | 4/1973 | Wolte | 180/66 R X |
| 3,823,792 | 7/1974 | Dinkloh | 180/44 F X |

Primary Examiner—Joseph F. Peters, Jr.
Assistant Examiner—Gene A. Church
Attorney, Agent, or Firm—Karl F. Ross

[57] ABSTRACT

A vehicle, especially a forklift truck, having an internal-combustion engine and a hydrostatic transmission driven thereby. The crankshaft of the engine extends parallel to the direction of travel of the vehicle, i.e., parallel to its longitudinal vertical median plane and the hydrostatic transmission has a pump connected with the crankshaft. The shaft of the pump is disposed on one side of this plane while the crankshaft of the engine is disposed on the opposite side of the median plane, the two shafts being interconnected by a belt drive.

8 Claims, 2 Drawing Figures

VEHICLE WITH INTERNAL-COMBUSTION ENGINE

FIELD OF THE INVENTION

The present invention relates to a vehicle driven by an internal-combustion engine and having a hydrostatic transmission and, more particularly, to an industrial floor-type vehicle, preferably a forklift truck, driven by an internal-combustion engine and having a hydrostatic transmission connected between this engine and the propelled wheels of the vehicle.

BACKGROUND OF THE INVENTION

It is known to provide floor-type industrial vehicles, especially forklift trucks, with internal-combustion engines which generate the motive force and with hydrostatic transmissions connected between such engines and the drivable wheels of the vehicle. The internal-combustion engine can be an in-line engine, i.e., an engine in which a plurality of cylinders are disposed in a common plane, i.e., in line one behind the other parallel to the axis of the engine and especially the axis of its crankshaft upon which the pistons of these cylinders act.

A hydrostatic transmission for this purpose generally includes an axial piston pump whose input shaft is connected to the crankshaft and one or more hydrostatic (axial-piston) motors which are connected to the pump by hydraulic passages. The motors and/or the piston are of the variable displacement type to change the transmission ratio.

Such drive systems are provided for forklift trucks and, in general, industrial stackers which are generally driven at low speed and carry large loads.

Conventional vehicle systems using hydrostatic transmissions of the aforedescribed type generally provide the pump of the hydrostatic transmission along the line of the crankshaft, i.e., with a direct coupling between the pump shaft and the crankshaft. The pump is either directly flanged onto the internal combustion engine or is affixed to an intermediate housing and is driven by an intermediate shaft which, in turn, is driven by the crankshaft, the intermediate housing being mounted upon the cylinder block of the engine.

The hydrostatic pump may be separated from the hydrostatic motors or motor of the transmission and can be connected thereto by hydraulic lines. It is also known, however, to mount the pump and one or more motors in a common housing which also is oriented in line with the crankshaft of the engine.

This orientation is usually also maintained when the prime mover of the vehicle is an electric motor and, for the most part, the compact construction of the transmission is employed when the vehicle is driven by an electric motor. On the other hand, when the vehicle is driven by an internal-combustion engine, the hydrostatic transmission is of the separated type, i.e., the motor or motors are spaced from the pump and are connected thereto by hydraulic conduits.

For example, in the forklift truck described in U.S. Pat. No. 3,208,222, the hydrostatic pump is formed as part of a compact transmission of the type HW-10 and is connected via an intermediate shaft with the electric motor and is oriented coaxially to the latter.

A similar arrangement is used with this type of hydrostatic transmission in forklift trucks driven by internal-combustion engines and made by the same company. The internal-combustion engine is generally an in-line Boxer engine with recumbent cylinders, i.e., the plane of the axes of the engine cylinders being inclined to the vertical or practically horizontal.

In diesel transport vehicles of the Linde hydrotype, the crankshaft of the internal-combustion engine is connected via an intermediate shaft with the pump of the hydrostatic transmission which can either be of the compact type with two hydrostatic motors or in the separable type depending upon the particular vehicle construction.

In Linde forklift trucks of the type H-12 and H-40, the pumps of the hydrostatic transmissions driving the vehicle are disposed coaxial to the shafts of the internal-combustion engines and are directly flanged on the latter. These pumps are connected by conduits to the hydrostatic motors which are flanged to or built into the axles of the driving wheels of the vehicle. In the Linde forklift truck of type H-20, the pump is formed as part of a compact transmission and disposed along the axle. The transmission is connected via an intermediate housing to the cylinder block of the internal-combustion engine with the pump shaft coaxial to the crankshaft of this engine. As a consequence, a compact drive block is formed between the axle and the internal-combustion engine.

In the Linde forklift trucks of types H-50 and H-35 NG, the pump in each case is directly flanged to the internal-combustion engine and is constituted as an extension thereof. The pumps are here also connected by conduits with the hydrostatic motors disposed in the respective axles and connected in parallel to one another.

All of these arrangements have the disadvantage that the drive assembly, including the engine and the transmissions, have relatively large axial dimensions, i.e., dimensions parallel to the crankshaft of the internal-combustion engine.

Since certain vehicles, especially forklift trucks, must be used in tight locations and thus should be as short as possible, i.e., should have minimum axial length or length parallel to the direction of travel, this construction of the drive train has been found to be disadvantageous.

OBJECTS OF THE INVENTION

It is the object of the present invention to provide a drive system for a vehicle of the type described whereby the disadvantages mentioned above are obviated.

It is also an object of the invention to provide a vehicle having an internal-combustion engine and a hydrostatic transmission which is relatively short and hence is free from the above-mentioned drawbacks.

Yet another object of the invention is to provide an improved, reliable, efficient and compact drive train for a forklift truck or like industrial vehicle.

SUMMARY OF THE INVENTION

These objects and others which will become apparent hereinafter are attained, in accordance with the present invention, in an industrial motor vehicle, especially a forklift truck, which comprises a vehicle chassis having a longitudinal median plane extending parallel to the direction of movement of the vehicle and an internal-combustion engine, preferably of the in-line type, whose crankshaft is parallel to this plane. The vehicle also comprises a hydrostatic transmission connected between this crankshaft and the drive wheels of the vehicle, the hydrostatic motors or motor of the transmission being connected to the drive wheels in the manner described with respect to the hydrostatic transmissions of the prior art discussed above. According to the principles of the present invention, the median plane of the internal-combustion engine is disposed out of the longitudinal median plane of the vehicle and at least the crankshaft of this engine is disposed to one side of the longitudinal median plane of the vehicle while the axis of the pump of the hydrostatic transmission is disposed to the opposite side of this longitudinal median plane, the pump and the engine lying adjacent one another.

More specifically, the internal-combustion engine is disposed to one side of the longitudinal median plane of the vehicle while the pump of the hydrostatic transmission is disposed to the opposite side of this plane.

With this construction, it is also possible to simplify the means for connecting the crankshaft to the input shaft of the pump. Thus, according to a feature of the invention, the crankshaft of the engine is connected to the drive shaft of the pump by means of a tractive element and a transmission including an endless element such as a V-belt. Thus a V-belt transmission may be provided between the crankshaft and the drive shaft of the pump.

According to another feature of the invention, the pump of the hydrostatic transmission propelling the vehicle is provided together with at least one further pump for operating various systems of the vehicle, e.g., the lifting hydraulics, the power steering or the like. When one or more additional pumps are provided for this purpose, they are provided in line with the axis of the shaft of the propelling pump mentioned previously and preferably the shafts of all of the pumps are connected together along a common axis. According to yet another feature of the invention, the internal-combustion engine and the propelling pump or the propelling pump together with the auxiliary pumps mentioned previously, are provided in a common intermediate frame supported on the vehicle chassis. The intermediate frame is advantageously connected by elastic elements to the vehicle chassis, i.e., the frame itself is suspended elastically in the chassis and all of the parts of the drive train except the hydraulic motors and the elements connected thereto, are mounted upon this elastically suspended intermediate frame or suspension.

According to a feature of the invention, the internal combustion engine has an inclined longitudinal median plane, i.e., the plane defined by the axes of the in-line cylinders is inclined to the vertical. This plane of the engine can be inclined downwardly away from the longitudinal median plane of the vehicle.

Advantageously, the engine compartment of the chassis is covered by a hood which can be formed unitarily with the driver's seat of the vehicle. In this case, the driver's seat can be sunk below the tops of the cylinder heads of the engine. In other words, the low point of the driver's seat may lie below the high point of the internal-combustion engine.

According to another feature of the invention, the engine compartment, i.e., the compartment enclosing the internal combustion engine and the pump or pumps is provided with a lining of acoustic insulation.

The configuration of the drive assembly of the vehicle of the present invention not only has the significant advantage that it reduces the overall length of the drive train and hence enables the longitudinal dimensions of the vehicle to be reduced, but it also significantly reduces the height of the driving compartment of the vehicle and acts to dispose the center of gravity thereof at an optimum location.

Because of this optimum repositioning of the center of gravity with respect to the point of attack of the load at the fork, it is possible to use a substantially reduced counterweighting of the vehicle body for any given load and thus reduce significantly the unloaded weight of the vehicle. This means that the mass which must be accelerated can be reduced and the vehicle made more versatile and mobile.

In addition, the seating level for the operator can be lowered since the driver need no longer sit directly above the internal-combustion engine but rather sits to one side thereof. This reduces the discomfort for the driver which might otherwise result from the heating of the engine, limits the vibrational effect upon the operator and thereby improves the sensitivity with which the vehicle can be maneuvered. It has also been found that the offset position of the seat provides, in conjunction with a lowering of the height thereof, a better line of sight for the operator for the pickup of loads and for travel along the track upon which the vehicle is to be displaced, i.e., the roadway or warehouse path.

The aforedescribed orientation of the pump or pumps enables the construction of the engine compartment to be simplified since it permits the engine compartment to be basically rectangular and thus affords a better configuration for acoustic damping. All of the pumps can be disposed in the engine compartment which, when provided with the acoustic insulation in the lining, traps the sound generated by the moving parts in an improved manner.

The system of the present invention has also been found to be advantageous because it permits the location of the hydraulic lines to be improved. The hydraulic lines can thus lie along one side of the forklift truck and can be provided along this side with associated hydraulic elements such as filters and valves one beside the other. This arrangement thus improves the access to parts requiring maintenance and repair.

The construction of the present invention also has been found to be less expensive than earlier configurations of the drive train. Thus, the coupling between the internal-combustion engine the pump of the transmission can be greatly simplified, either by providing it as a simple pair of meshing gears or as a V-belt transmission in the manner mentioned previously.

The system has been found to be more versatile in that it allows a variety of pumps of different sizes and configurations to be mounted in the engine compartment, merely by varying the transmission connecting the pump shaft with the crankshaft. A modification of this type is of low cost and relatively simple since V-belt transmissions can be altered merely by changing one of the V-belt pulleys.

A number of different variants can thus be assembled by mass-production techniques without major modification of the engine compartment. Furthermore, the arrangement allows various types of internal-combustion engines to be used with a given pump or with a variety of pumps in the manner described depending upon the particular needs and, again, without significant modification of the assembly line production of the vehicle. For example, gasoline-driven internal-combustion engines, diesel engines, gas-powered Otto engines may be substituted for one another at will depending upon the economic and political needs.

Since the various internal-combustion engines may have different output speeds, it is a simple matter to compensate the various speeds to the optimum required for driving the pump by simple modification of the transmission ratio of the mechanical transmission between the internal-combustion engine and the pump.

The pump of the hydrostatic transmission can be directly connected, e.g., by screws, to the cylinder block of the internal-combustion engine. For example, the cylinder block may be provided with a lateral pedestal for the pump.

Alternatively, the combustion engine and or the pump may be mounted directly in the vehicle chassis.

However, because the internal-combustion engine generates vibrations which are best not transmitted to the vehicle chassis, it has been found that the elastic suspension mentioned previously affords a simple way of avoiding the transmission of vibration of this type. Since the internal-combustion engine and the pump undergo no relative movements, it has been found to be advantageous to mount both the internal-combustion engine and the pump in a relatively light intermediate frame which is elastically suspended in the vehicle chassis.

The pump for the hydrostatic transmission driving the vehicle is normally provided as a variable displacement pump. According to a feature of the invention, the additional or auxiliary pump or pumps can be provided on the side of the transmission pump opposite that which is provided with the driven shaft. These further pumps can be flanged on one another or upon the housing of the transmission pump. Preferably, therefore, each auxiliary pump driving, for example, the lift cylinders of the forklift, is of a configuration enabling still further pumps to be flanged thereto, i.e., attached by bolts interconnecting the pump housings.

This enables a plurality of pumps to be connected together directly. Naturally, the pumps may be mounted individually upon the suspended frame or upon an intermediate frame, the drive shafts of the pumps being interconnected by further belt drives if desired.

Most advantageously, the shafts of the pumps are directly connected together by respective shaft couplings.

The pump for the hydrostatic vehicle-propelling transmission is preferably an axial piston pump. The auxiliary or additional pumps can be provided to drive, for example, the lifting cylinders and, if desired, the tilting cylinders for tilting the mast which carries the vertically displaceable fork. Yet another pump can be provided to supply the pressurized fluid for a power-steering device for the vehicle. If other hydraulically powered systems are provided, separate pumps can be provided for them or they can be connected to the pumps previously described. The auxiliary or further pumps can be either axial piston pumps or radial piston pumps or even gear pumps or rotary vane pumps as required for the particular fluid demands and pressures. Thus, pumps of different types can be flanged together and can have their shafts coupled together.

The aforedescribed arrangement of the drive train, especially when it is mounted on an intermediate frame suspended by elastomeric or fluid vibration dampers upon the vehicle chassis, has been found to be most effective when the hydrostatic transmission for driving the vehicle is of the separated type, i.e., the pump is connected to the hydrostatic motor or motors via conduits. In this case, the portion of the drive train mounted on the intermediate frame or upon the chassis does not have free forces or moments to transmit which must be supported. All of the force transmission from the drive train described to the vehicle wheels is via fluid passed through the conduits.

It should be mentioned that forklift vehicles with internal-combustion piston engines and electric prime movers can comprise an electric generator and an electric motor such that the electrical system can include a stepless variable transmission between the generator and motor. While this system also is free from moments or forces which are applied by the driving portion of the train to the frame or chassis, the system is not always practical and frequently is less efficient than arrangements with hydraulic transmissions of the type concerned in the present invention. The prior-art systems of this type, however, do include Otto engines with recumbent cylinders in the so-called Boxer in-line arrangement whereby the generator is disposed below the internal-combustion engine. In this case, the crankshaft of the internal-combustion engine and the shaft of the generator lie together in the longitudinal median plane of the vehicle. As a consequence, the drive assembly has a relatively high and unsatisfactory location of the center of gravity and also poses various problems with respect to maintenance because the electric generator lies directly beneath the crankshaft housing of the internal-combustion engine. A forklift truck of this type is marketed by STILL GmbH under the designation BEGS 1002.

In yet another forklift truck with an electric drive, the engine is of the diesel type and is disposed transverse to the longitudinal axis of the vehicle while the electric generator is parallel thereto and is disposed, in the direction of travel of the vehicle, ahead of the diesel engine. In such an arrangement in which the crankshaft lies transversely to the direction of travel of the vehicle, problems are also encountered with respect to the position of the center of gravity, accessibility for maintenance and repair and the transmission of vibration.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
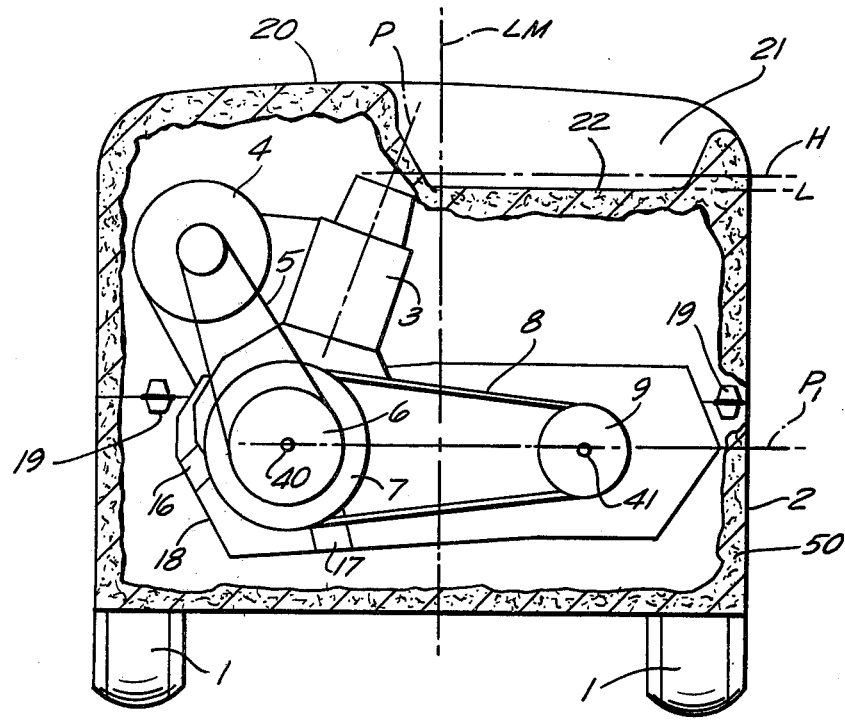
FIG. 1 is a diagrammatic vertical cross-sectional view taken in a plane perpendicular to the longitudinal median plane of the vehicle.
Figure 2:
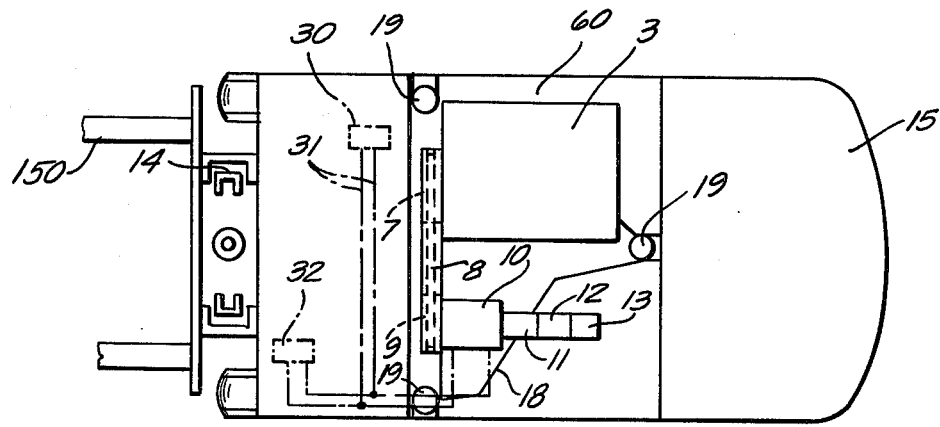
FIG. 2 is a diagrammatic plan view of the forklift truck shown in FIG. 1 with portions thereof broken away.

FIGS. 1 and 2 show a forklift truck embodying the present invention, FIG. 2 showing the vehicle from above with the motor hood removed.

The vehicle comprises the usual wheels, two of which are shown at 1 in FIGS. 1 and 2, which are mounted on a vehicle chassis generally represented at 2.

The internal-combustion engine 3 is of the piston in-line type and is provided with a fan 4 for the air cooling of this engine. The fan 4 is driven by a V-belt transmission 5 from a pulley 6 mounted upon the crankshaft 40 of the engine.

The crankshaft 40 also carries a V-belt pulley 7 which is connected by a V-belt 8 to a driven pulley 9 connected to the shaft 41 of an axial piston pump 10 of the variable displacement type. This pump may form part of a separable transmission as described in the publications mentioned previously dealing with hydrostatic transmissions. More particularly, the axial piston pump 10 may be connected by hydraulic lines 31 to a pair of hydrostatic motors 30 and 32 connected to the driven wheels 1 of the vehicle.

The axial piston pump 10 is so constructed that three auxiliary pumps 11, 12 and 13 can be connected to each other and to the pump housing 10 by bolts through respective flanges, not shown, in line with the axis of shaft 41.

The pump 11 serves to supply hydraulic fluid to the cylinders of the mast 14 of the vehicle to raise and lower the fork 150. The pump 12 can supply hydraulic fluid to a power-steering mechanism, not shown, while the pump 13 can be provided to supply a hydraulic fluid to any auxiliary hydraulic circuits which may be provided. Such hydraulic circuits may include one or more cylinders for tilting the mast.

The counterweight 15 is disposed upon the vehicle behind the engine 3 and may be provided with ducts through which the cooling air may be admitted to the engine compartment 60 or discharged therefrom in the manner described in our copending application Ser. No. 857,192 filed Dec. 2, 1977 based upon German application No. P 26 55 441.6 filed Dec. 7, 1976.

The internal-combustion engine 3 is connected by posts or supports 16 and 17 to an intermediate frame 18 shown only diagrammatically and although carrying, via means not shown, the pump 10 upon which the pumps 11 through 13 are mounted.

In the embodiment illustrated, the pump 11 is flanged to the pump 10 and has its shaft connected to the drive shaft of pump 10. The pump 12 is flanged to be pump 11 and the pump 13 is flanged to the pump 12.

The intermediate frame 18 is elastically suspended via elastomeric or fluid damper cushions 19 upon the vehicle chassis 2. In the embodiment illustrated in FIG. 2, three such elastic suspension elements 19 are provided at the vertices of an isosceles triangle. It is also possible, however, to provide four or more such suspension elements at vertices of corresponding polygons.

The vehicle chassis 2 carries a removable engine compartment hood 20 which is formed with a trough or recess 21 receiving a seat for the driver. The bottom 22 of the recess 21 lies at a level L below the high point H of the engine 3. The cylinders of the engine 3 lie in a plane P which is inclined to the longitudinal median plane LM of the vehicle and diverges from this median plane downwardly. The axes of the crankshaft 40 and the pump shaft 41 lie in a plane $P_1$ which is perpendicular to the plane LM.

The crankshaft 20 and, indeed, all of the engine 3, lies to the left of the longitudinal median plane LM while all of the pumps 10 through 13 lie to the right thereof as the system is viewed in FIG. 1. Both the crankshaft and the pump shaft have their axes extending parallel to the longitudinal median plane LM.

The entire drive assembly 3 through 13 is received in the engine compartment 60 which is closed via the hood 20 and has a relatively simple and flat configuration. Thus the driver's seat can be positioned fairly low upon the vehicle and the intermediate frame 18 can have a simple configuration. All the parts of the engine and drive train are readily accessible upon removal of the hood and access is facilitated even to the mounting point 16 and 17 upon the frame and the locations at which the pump 10 is mounted thereon. Free access is also afforded to the suspension elements 19. In addition, the arrangement provides a larger free space to one side of the engine which is more useful than two small free spaces symmetrically disposed on either side thereof.

Finally, the interior of the hood 20 and of the chassis 2 lining the compartment 60 is provided with a layer 50 of acoustic insulation.

We claim:

1. A vehicle comprising:
   a chassis having a vertical longitudinal median plane extending in the direction of travel of the vehicle;
   a piston-type internal-combustion engine having a crankshaft extending parallel to said plane; and
   a hydrostatic transmission including a hydrostatic pump and at least one hydrostatic motor connected to a wheel of the vehicle for propelling same, said pump having a shaft extending parallel to said longitudinal median plane and connected to said crankshaft by a force transmission element, said crankshaft having a central plane disposed out of the longitudinal median plane and to one side thereof, said pump being disposed on the opposite side of said longitudinal median plane and directly alongside said engine.

2. The vehicle defined in claim 1 which is a forklift truck and wherein said force transmission element comprises a belt drive coupling said crankshaft to said pump shaft.

3. The forklift truck defined in claim 2, further comprising at least one additional pump connected to the first-mentioned pump coaxial therewith and having a shaft connected to the shaft of said first-mentioned pump.

4. The forklift truck defined in claim 3 wherein said engine and at least one of said pumps are mounted on an intermediate frame disposed within said chassis.

5. The forklift truck defined in claim 4 further comprising elastic suspension means supporting said frame on said chassis.

6. The forklift truck defined in claim 2 wherein said engine has its pistons disposed in line and a plane through the axes of the pistons and cylinders of said engine is inclined to the vertical longitudinal median plane of the truck as viewed along the axes of said shafts.

7. The forklift truck defined in claim 6 wherein said chassis is provided with a hood enclosing an engine compartment receiving said engine and said pump, said hood being formed with a recess adapted to receive a driver's seat for the truck, the low point of said recess being disposed above the high point of said engine.

8. The forklift truck defined in claim 2 wherein said chassis is formed with an engine compartment receiving said engine and said pump, said compartment being lined with acoustic insulation.

* * * * *